UNITED STATES PATENT OFFICE.

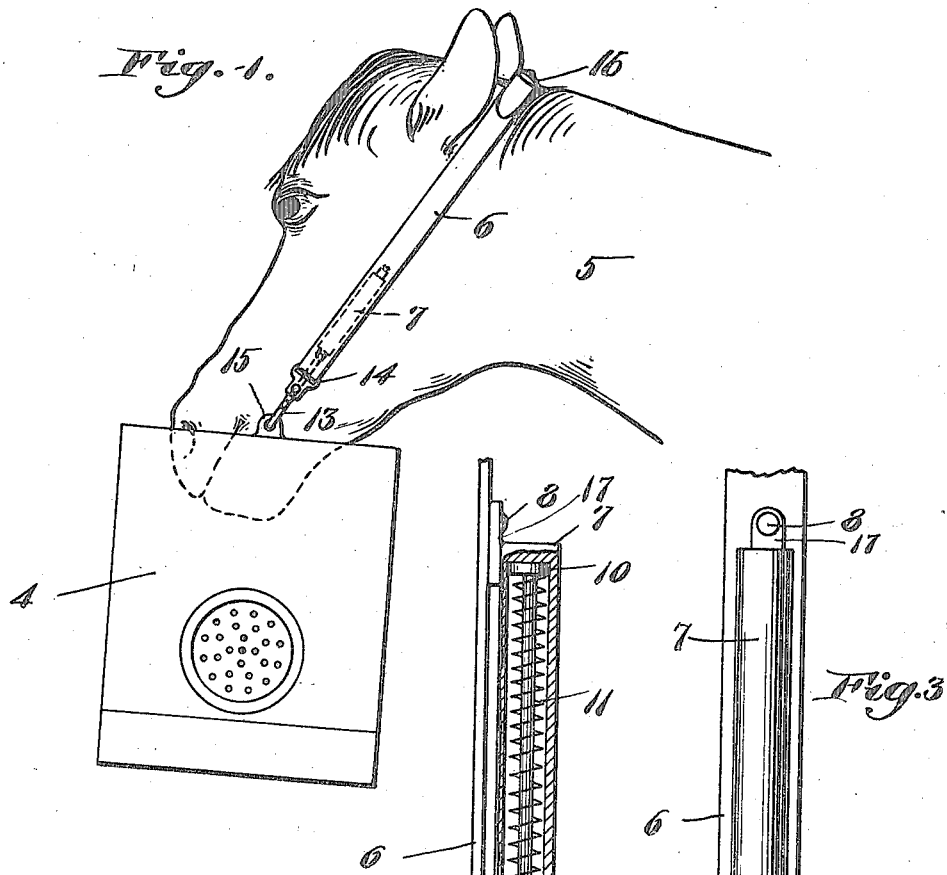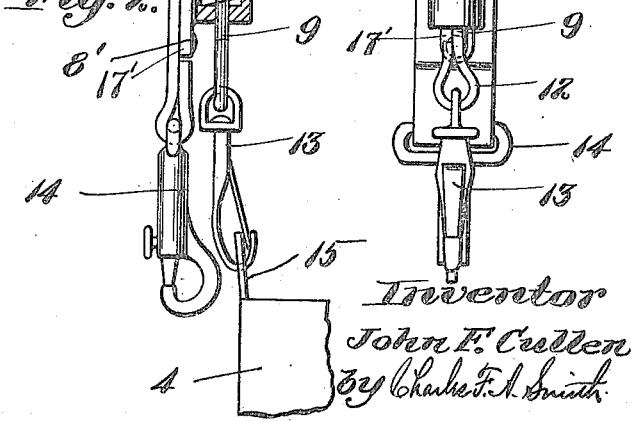

JOHN F. CULLEN, OF CHARLESTOWN, MASSACHUSETTS.

AUTOMATIC HORSE-FEEDING ATTACHMENT.

1,257,681.           Specification of Letters Patent.     Patented Feb. 26, 1918.

Application filed November 17, 1917. Serial No. 202,863.

*To all whom it may concern:*

Be it known that I, JOHN F. CULLEN, a citizen of the United States, residing at Charlestown, in the county of Suffolk and State of Massachusetts, have invented certain new and useful Improvements in Automatic Horse-Feeding Attachments, of which the following is a specification, reference being had therein to the accompanying drawings.

My present invention relates to certain new and useful improvements for use in connection with animal feed bags.

The invention consists in an attachment for use on feed bags, holding grain, such as corn or oats, for animals, particularly horses and mules, whereby the grain within the bag when the bag is in use, is always within reach of the animal's mouth, so that it becomes unnecessary for the animal to toss its head to throw the grain upward into its mouth.

The object of my invention is to enable the animal to feed in the shortest possible time, with the greatest amount of comfort without wasting any of the grain and thus insuring to the animal as full a meal as intended by the attendant.

Another object of the invention, is to bring the bag, as the grain is being eaten, closer up over the animal's snout, so that grain will not be thrown out over the top of the bag onto the floor or the street.

It is also may aim to provide such a device of the very simplest construction, free from complications, which will at all times insure efficiency of service.

The invention consists in certain novel features of construction and arrangement of parts which will be fully understood by reference to the description of the drawings and to the claims hereinafter given.

Referring to the drawings: Figure 1 is a side elevation of a feed bag having my automatic horse feeding attachment in operative position thereon and showing the same on the animal's head. Fig. 2 is a side elevation of my attachment, with the spring box in section. Fig. 3 is a front elevation of the same.

Similar characters designate like parts throughout the several figures of the drawings.

Latitude is allowed herein as to details, as they may be changed or varied at will without departing from the spirit of my invention and the same yet remain intact and be protected.

In the drawings the numeral 4 designates the feed bag, which may be of the usual type constructed of canvas or of metal with the series of air holes as shown on the drawings, and provided with a pair of ears 15 for attaching the supporting strap 6 thereto, so that the bag is held up to the animal's snout, 5; the feed bag 4 and its ears 15 form no part of my invention.

The strap 6 may consist of one piece extending over the animal's head, or it may be made of two parts joined by the buckle 16, and each end of the strap is provided with the following device consisting of an oblong box or case 7, preferably cylindrical, and being riveted to strap 6 by the rivets 8, 8' extending through the lugs 17, 17' formed or brazed to the ends of the case 7. Rod 9 extends upward through the bottom of the case 7 and carries at its upper inclosed end a head 10 against which presses the upper end of the spiral spring 11 entirely within the case and encircling the rod 9. The lower end of the spring presses against the inner end causing the head 10 to be in its uppermost position against the inner top and when no weight or pulling power is applied to the lower end of the rod. The lower end of the rod extending without the case is looped as at 12 extending through the eye end of the hook member 13, which hook engages with the ear 15 of feed bag 4.

The spring is adjusted so as to be contracted within the case 7 when the feed bag is full of grain and to gradually raise the bag upward on the animal's snout as the grain is eaten, so that when the bag is empty or nearly so, the spring would have been expanded to bring the head 10 in its uppermost position. This device 7 with its movable members may be attached to the inner or the outer sides of the strap 6; in Fig. 1 I have shown it as being attached to the inner side of strap so as to be between the animal's snout and the inner side of the strap. The strap 6 may be extended beyond the lower rivet 8' forming a loop in which is carried the hook 14; these hooks 14 being adapted to be inserted in the ears of a water pail when the attendant or driver desires to water the horse, as many water pails are not provided with a bail and the use of the hook 13 would cause too much strain on the spring 11 and unnecessarily tend to weaken it. This hook 14 and my device for raising the feed bag may be attached to the straps now in use, if so desired, and any form of strap 6 to properly secure the bag in position on the animal's head may be used.

It is to be understood that my invention is not limited to the specific details of construction shown in the accompanying drawings, but that said details may be varied in the practical carrying out of my invention. It is also to be understood that the combinations specifically set forth in the several claims are intended to be separately claimed without limitation to the use in connection therewith of other features and details of construction illustrated.

Having described my invention, I claim—

1. An automatic horse feed bag attachment adapted to be riveted to a strap, comprising an oblong case provided with an opening in its lower end, a rod partly extending through the opening upward into the case having a head at its inner end, a spiral spring encircling the rod and pressing upward against the head to normally keep the rod in its uppermost position, extensions carried by the rear of the case, one extending above the top of the case and the other below the bottom of the case and through which rivets may be passed to secure the attachment to a head strap, a swivel mounted in a loop formed by the lower end of the rod outside of the case, and a hook carried by and turning in the swivel to connect with the top of an animal feed bag, substantially as shown and described.

2. An automatic horse feeding attachment consisting of a strap, hooks at each end of the strap, spring actuated members riveted to each end of the strap above the hooks, and hooks carried by the spring actuated members, substantially as shown.

3. A feed bag attachment consisting of a strap, hooks carried by each end of the strap, a case riveted to each end of the strap above the hooks, a rod extending through the bottom of the case upward into it and provided with a head at its upper end, a spiral spring encircling the rod and pressing upward against the head, and a hook carried by the lower end of the rod for attachment to the ear of a feed bag, substantially as shown and described.

In testimony whereof I affix my signature.

JOHN F. CULLEN.